(12) United States Patent  
Cavarec et al.

(10) Patent No.: US 7,129,657 B2
(45) Date of Patent: Oct. 31, 2006

(54) SINGLE TRACK BRUSH-BASED POSITION ENCODER FOR ROTATING SHAFT

(75) Inventors: Pierre-Emmanuel Cavarec, San Diego, CA (US); Christopher K. Schroeder, San Diego, CA (US)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/862,734

(22) Filed: Jun. 7, 2004

(65) Prior Publication Data

US 2005/0280381 A1    Dec. 22, 2005

(51) Int. Cl.
  H02P 1/00 (2006.01)
  H02P 1/22 (2006.01)
  H02P 1/40 (2006.01)
  H02P 3/00 (2006.01)
  H02P 3/22 (2006.01)

(52) U.S. Cl. ............ 318/280; 318/244; 318/245; 318/246; 318/541; 318/466; 310/68 B; 310/68 E; 310/68 R; 310/233; 310/237

(58) Field of Classification Search ........ 318/244–246, 318/280, 541, 466; 310/68 B, 68 E, 68 R, 310/233, 237
See application file for complete search history.

(56) References Cited

U.S. PATENT DOCUMENTS 4,856,574 A * 8/1989 Minami et al. ....... 160/168.1 R
5,540,269 A * 7/1996 Plumer ........................ 160/3
5,734,240 A * 3/1998 Janca et al. ................ 318/280
5,760,558 A * 6/1998 Popat ......................... 318/480
5,898,288 A * 4/1999 Rice et al. .................. 318/685
6,239,564 B1 * 5/2001 Boe et al. ................... 318/254
6,619,365 B1 * 9/2003 Wen et al. ............ 160/168.1 P
6,789,597 B1 * 9/2004 Wen et al. ............ 160/168.1 P
2002/0125113 A1   9/2002 Bhakta et al. .............. 200/11

FOREIGN PATENT DOCUMENTS

EP    0 184 997         10/1985
EP    0 644 401 A1      7/1994
EP    0859224 A2        8/1998

* cited by examiner

Primary Examiner—Lincoln Donovan
Assistant Examiner—Erick Glass
(74) Attorney, Agent, or Firm—Frommer Lawrence & Haug LLP; Ronald R. Santucci (57) ABSTRACT

A position sensor generates a signal representative of the angular position and, if desired, angular velocity of a rotating object using only a single circular track and plural brushes that ride on the track when the object rotates. The single circular track can have plural segments, and the sensor can generate more than one signal cycle per revolution.

27 Claims, 5 Drawing Sheets

Fig. 5
fixed brushes -
2 cycles/revolution

Fig. 6
moving brushes -
2 cycles/revolution

Fig. 7
3 cycles per
revolution

SINGLE TRACK BRUSH-BASED POSITION ENCODER FOR ROTATING SHAFT

FIELD OF THE INVENTION

The present invention relates generally to brush-based position encoders for outputting the positions of rotating shafts, and more particularly for position encoders for motorized window coverings, awnings, security screens, projection screens, and the like.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The present assignee has also provided systems for determining the position of the window coverings based on counting motor pulses. By knowing the position of the window coverings, features such as automatic repositioning the window covering to a preset position can be provided.

As recognized herein, brush-based position encoders for outputting the positions of rotating shafts have been provided, and advantageously tend to be inexpensive and reliable. In brush-based systems, brushes are provided that ride on tracks each of which describes a portion of a circle and each of which is staggered relative to the other two, i.e., the three tracks have different radii than each other. Either the brushes rotate with the shaft and the tracks are stationary, or the tracks rotate with the shaft and the brushes are stationary. In either case, to provide a quadrature signal output, three tracks and three brushes are used, one brush per track.

As further recognized herein, such brush-based systems require sufficient space to accommodate the three tracks, making them difficult to fit into small systems. Also, each brush must be lined up with each track, to ensure it rides on its track and only its track. The positioning of the brushes is thus critical, requiring tighter tolerances between components and, thus, higher manufacturing costs. Having made the critical observation that a brush-based quadrature position encoder is needed that can fit into small systems and/or that permits the use of looser tolerances for positioning brushes than is currently possible, the present invention has been provided.

SUMMARY OF THE INVENTION

A powered assembly includes an object that can be moved between a first configuration and a second configuration. The object can be selected from the group consisting of window coverings, awnings, skylight coverings, curtains, and screens. The assembly also includes a motor assembly and an actuator coupled to the motor assembly and the object to move the object when the motor is energized. A position sensor generates a signal representative of the angular position of the motor assembly and/or the actuator. The position sensor includes plural brushes and one and only one track defining a single radius, with the track including at least one track segment defining a portion of a circle. The brushes ride on the track, and relative motion between the track and brushes is effected when the object is moved to generate a signal representative of an angular position.

The actuator may be a roll-up tube of a shade, in which case the position sensor might sense the angular position of the tube. A ring gear can rotate with the roll-up tube and a position sensor gear is meshed with the ring gear and coupled to the brushes or the track to move the brushes or track relative to each other.

In some embodiments of the position sensor the brushes rotate and the track includes first, second, and third track segments each spanning approximately ninety degrees (90°). The plural brushes include first, second, and third brushes, with a first signal tap being established on the first track segment, a second signal tap being established on the third track segment, and a reference voltage tap being established on the second track segment intermediate the first and third track segments. In other embodiments the track rotates and the track spans approximately two hundred seventy degrees (270°). The plural brushes include first, second, and third brushes, with a first signal tap being established on the first brush, a second signal tap being established on the third brush, and a reference voltage tap being established on the second brush intermediate the first and third brushes. In yet other embodiments the brushes rotate and the track includes at least first and second groups of three track segments each. The first and second groups are spaced from each other by forty five degrees (45°) or less, and the position sensor outputs two signal cycles for each complete revolution. Or, the track might rotate and include at least first and second track segments, with the first and second track segments being spaced from each other by forty five degrees (45°) or less and with the position sensor outputting at least two signal cycles for each complete revolution. The above principles can be extended to a track that includes at least first, second, and third track segments spaced from each other for outputting at least three signal cycles for each complete revolution.

In another aspect, a position sensor can be coupled to a rotating object for generating a signal representative of the angular position, angular speed, and/or direction of rotation, of the object. The position sensor includes at least one track segment defining a portion of a circle characterized by a radius, and plural brushes each being spaced from the center of the circle by a distance substantially equal to the radius. The brushes ride on the track segment to generate signals when rotation of the object causes relative motion between the brushes and track segment.

In still another aspect, a position sensor is disclosed for outputting a quadrature signal representative of the angular position of a rotatable object using track structure defining a single track circle. One or more track segments are disposed on the circle, and plural brushes ride on the track segment when the object rotates.

The details of the present invention, both as to its construction and operation, can best be understood in reference to the accompanying drawings, in which like numerals refer to like parts, and which:

DETAILED DESCRIPTION OF THE PREFERRED EMBODIMENT

The present invention is a position encoding system for any rotating shaft, i.e., a sensor for outputting a signal representing the angular position of a rotatable object. For illustration, FIG. 1 shows the position sensor implemented in a window covering, but it is to be understood that the present position sensor as embodied in any of the implementations shown in FIGS. 3–7 may be used to output a signal representative of the angular position of any shaft (and, if desired, the angular velocity of the shaft) in accordance with present principles.

Figure 1:
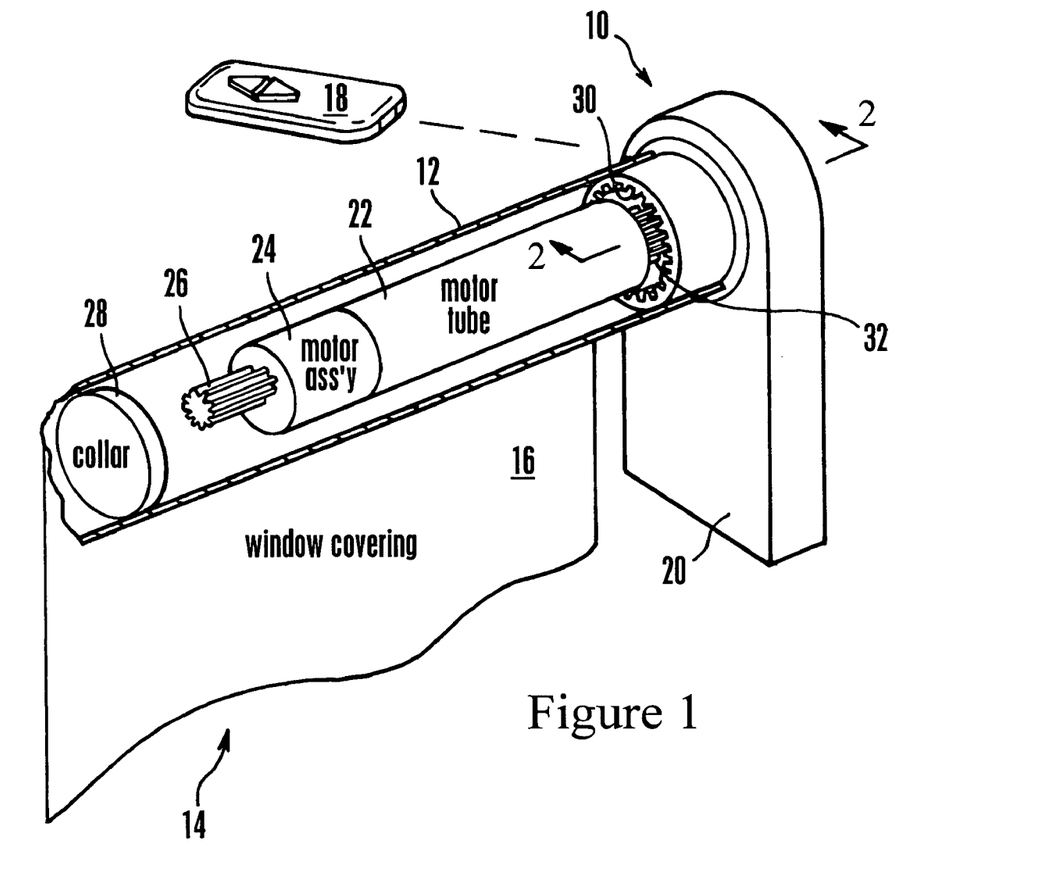
FIG. 1 is a perspective view of a window covering actuator, shown in one intended environment, with portions of the head rail, window covering, and head rail ring gear cut away for clarity and showing the collar exploded away from the roller tube.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. The actuator 12 may be rotatably mounted in a head rail of the window covering 14. When the actuator 12 is rotated about its longitudinal axis, the shade 16 raises or lowers between an open configuration and a closed configuration.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

FIG. 1 shows that a hand-held user command signal generator 18 can be used to generate a command signal to move the object using an infrared (IR) remote-control unit or a radio frequency (RF) remote-control unit. Or, the user command signal may be generated by any other means of communication well known in the art, such as by manipulable manual switches. The user command signals can include open, close, raise, lower, and so on.

An oblong end cap 20 can enclose one end of the tube 12 and can include portions of the present position sensor in non-limiting illustrative embodiments as well as portions of the non-limiting motor assembly. Specifically, the end cap 20 can support a motor tube 22 with small ac or dc motor assembly 24. Reduction gears, electronics, and alkaline or Lithium primary dc batteries (which can be the sole source of power for the motor if desired) can be supported in the motor tube 22. The motor assembly 24 turns an output shaft 26 that can be engaged with a collar 28. In turn, the collar 28 can be engaged with the tube 12 to turn the tube 12. Details of the assembly thus far shown and described can be found in the above-referenced patent.

Figure 2:
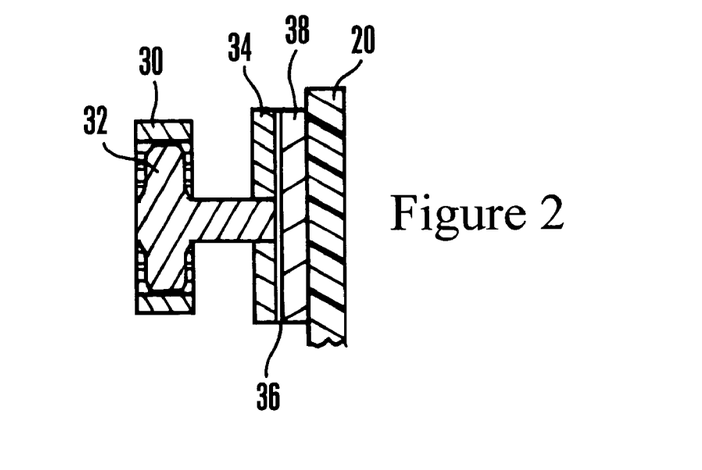
FIG. 2 is a cross-sectional view as seen along the line 2—2 in FIG. 1.

In cross-reference to FIGS. 1 and 2, a ring gear 30 can circumscribe the inner surface of the tube 12. A position sensor gear 32 can be meshed with the ring gear 30 to turn as the tube 12 turns. Alternatively, the position sensor gear can be coupled to the motor assembly 24 or to reduction gearing thereof to turn when these components turn. In any case, the position sensor gear 32 can be shaft-like structure that may rotate on or within the motor tube 22 or other structure.

As best shown in FIG. 2, the position sensor gear 32 may be connected to electrically conductive brushes 34 that ride against a metal track 36 that in turn can be formed on an electronic circuit board 38 in the end cap 20. Alternatively, the position sensor gear 32 can be connected to the track to rotate the track against stationary brushes. In any case, any of the position sensors shown in FIGS. 3–7 may be used in the system shown in FIGS. 1 and 2 to output signals that represent the angular position of a rotatable object (as well as its angular velocity if desired). In the non-limiting embodiment of FIGS. 1 and 2, the rotatable object is the roller tube 12.

The preferred electronic circuit board 38 includes a microprocessor for processing the command signals from the signal generator 18 as well as the signal from the present position sensor. Also, the circuit board 38 may include appropriate signal conditioning circuitry that is electrically connected to the below-disclosed position sensor to condition and send the signals to a processor on the circuit board 38 for determining the position and/or speed and/or direction of rotation of the roller tube.

As set forth in the above-referenced U.S. patent, a user can manipulate the signal generator 18 to generate a signal that is sent to signal processing circuitry in the circuit board 38. In turn, the motor assembly 24 is energized to move the window covering open or closed in accordance with the command signal under control of the processor on the electronic circuit board 38 using algorithms that can depend on the angular position of the rotatable object, in the present invention as sensed by the present position sensor.

Now referring to FIGS. 3a–3d, a first embodiment of the present position sensor can be seen, generally designated 40. In general, the sensor 40 includes one and only one track, which can be a unitary structure or which can define plural segments but in any case which is partially circular to thereby define a circle characterized by a radius. Plural brushes are disposed to ride on the track when the object being measured turns, such that the brushes each are spaced from the center of the circle by a distance substantially equal to the radius.

Figure 3A:
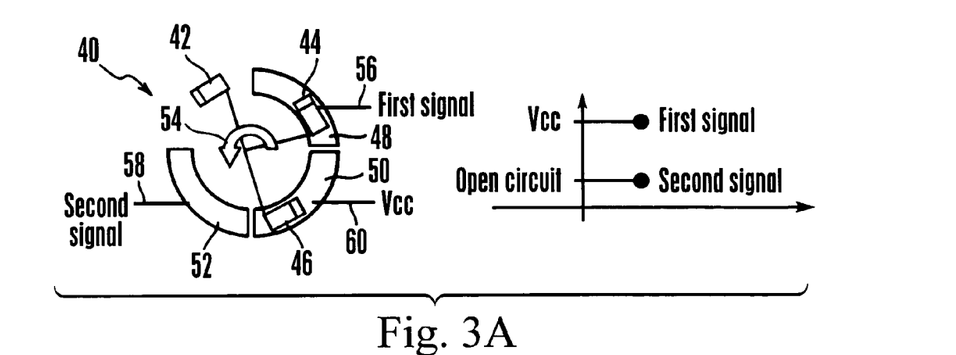
FIGS. 3a–3d are plan views of one embodiment of the position sensor in various configurations, wherein the brushes rotate, along with respective schematic diagrams of the signals that are generated in each configuration.
Figure 3B:
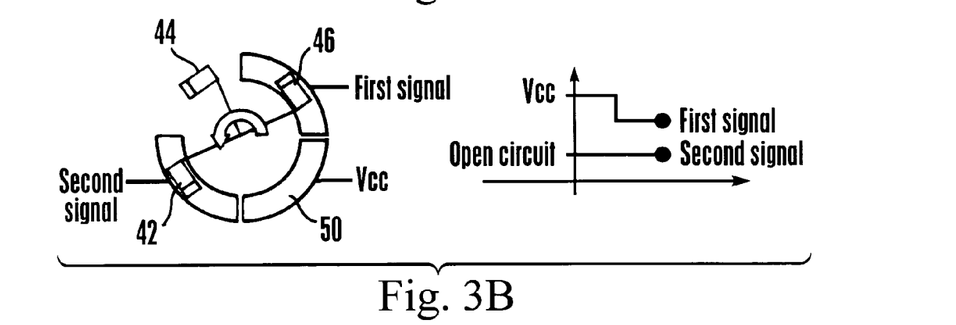
Figure 3C:
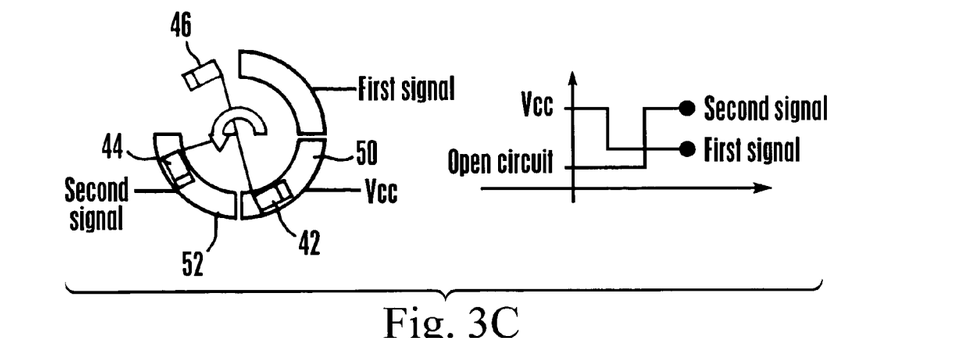

With more specificity regarding the particular sensor 40 shown in FIGS. 3a–3b, first through third brushes 42, 44, 46 ride against first through third track segments 48, 50, 52. In the embodiment shown in FIGS. 3a–3d, the brushes 42, 44, 46 are electrically connected to each other as shown, and are coupled to the rotatable object the angular position of which is sought to be sensed for counterclockwise (CCW) rotation as indicated by the arrow 54. It is to be understood, however, that clockwise (CW) rotation is also envisioned.

The track segments 48, 50, 52 establish a single track member that encompasses two hundred seventy degrees (270°) of a circle, and the first and second track segments 48, 50 are separated from each other by just enough space or non-conductive material to prevent electrical conduction from segment 48 to segment 50. Likewise, the second and third track segments 50, 52 are separated from each other by just enough space or non-conductive material to prevent electrical conduction from segment 50 to segment 52. Accordingly, each track segment 48, 50, 52 spans approximately ninety degrees (90°).

FIGS. 3a–3d show that in a non-limiting embodiment the first brush 42 is angularly spaced from the second brush 44 by marginally less than ninety degrees (90°), e.g., by eighty nine degrees (89°), although other spacings more generally can be used. Similarly, the second brush 44 may be angularly spaced from the third brush 46 by marginally less than ninety degrees (90°).

As shown in FIGS. 3a–3d, a first signal tap 56 is established on the first track segment 48 and a second signal tap 58 is established on the third track segment 52. A reference voltage input 60 (designated "$V_{cc}$" in the drawings) is applied the second track segment 50 intermediate the first and third track segments 48, 52. A voltage is applied at the reference voltage signal input 60, and the voltages at the first and second signal taps 56, 58 are sent to processing circuitry as indicators of the angular position of the object.

With the above structure in mind, the graph in FIG. 3a shows that when the brushes 42, 44, 46 are rotated to the position shown in FIG. 3a, the signal (labelled "first signal") from the first signal tap 56 is high, i.e., it substantially equals the reference voltage, because the second brush 44 is on the first track segment 48 and the third brush 46 is on the second track segment 50, thereby electrically connecting the reference voltage to the first signal tap 56. No brush, however, is on the third track segment 52, so that the signal from the second signal tap 58 is low, as shown in the graph of FIG. 3a.

FIG. 3b shows that when the brushes have rotated around 90°, no brush is on the second track segment 50 where the reference voltage tap is, so both first and second signals are low. However, another 90° rotation results in the first brush 42 being located on the second track segment 50 and the second brush 44 being located on the third track segment 52, so that the second signal tap is electrically connected to the reference voltage and, hence, the second signal is high as shown. The first signal is low because no brush is on the first track segment 48.

Figure 3D:
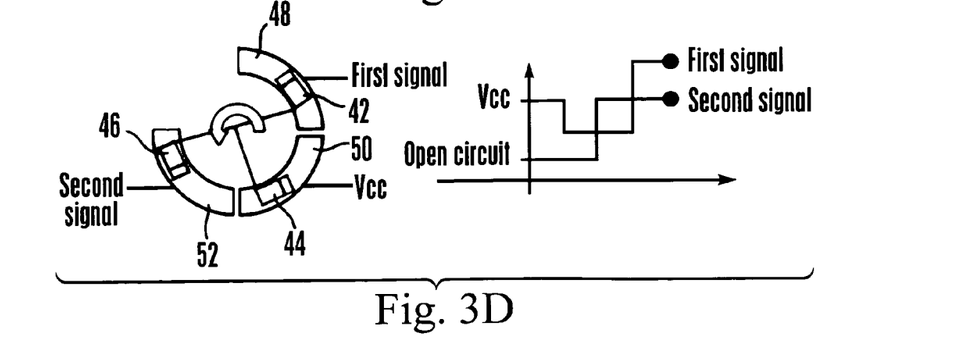
Figure 4A:
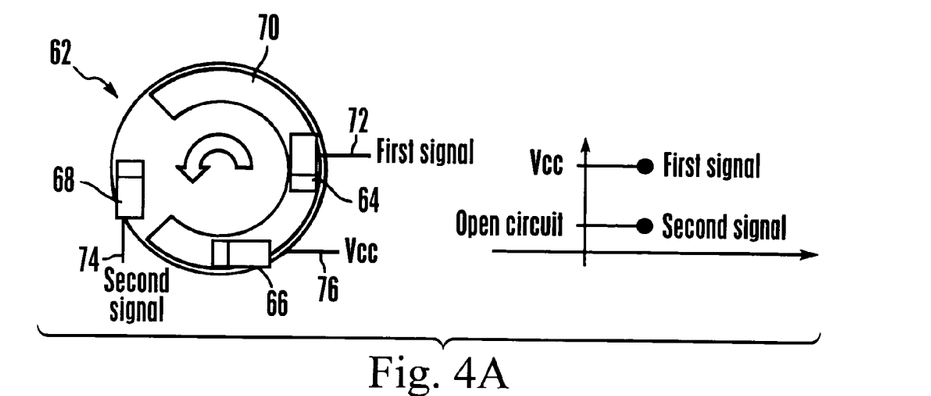
FIGS. 4a–4d are plan views of an alternate embodiment of the position sensor in various configurations, wherein the track rotates, along with respective schematic diagrams of the signals that are generated in each configuration.
Figure 4B:
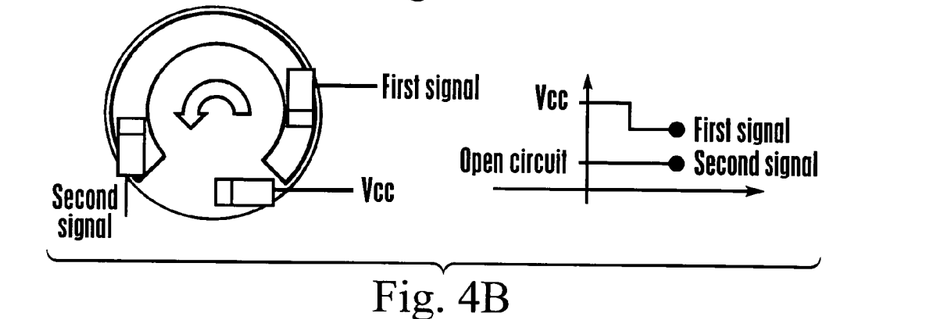
Figure 4C:
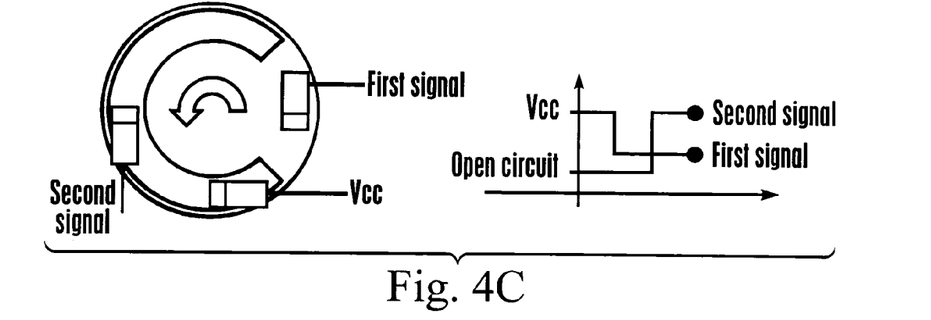
Figure 4D:
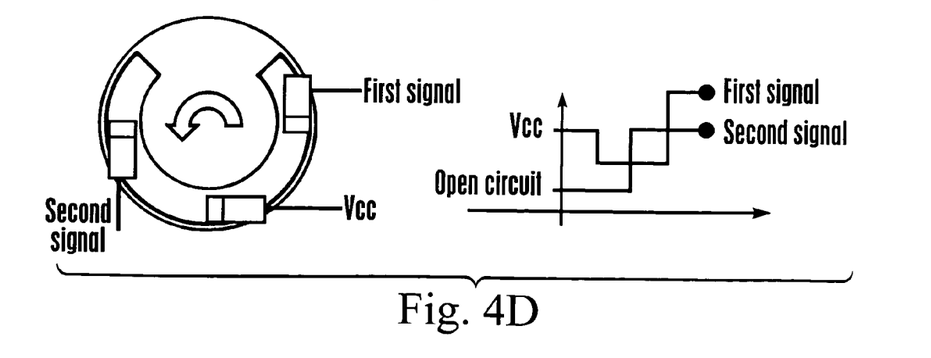

The last 90° rotation of a full revolution results in the configuration shown in FIG. 3d, in which each track segment bears a respective brush, driving both signals high. It may now be appreciated that the signals shown are correlated to the respective brush positions and, hence, to angular positions of the sensor 40 (and, thus, to the angular position of the rotatable object to which the brushes are connected).

It now may be further appreciated that by measuring the time period between signal transitions, the angular speed of the sensor 40 can be determined by dividing the angular spacing between adjacent brushes by the time period between signal transitions. Further, by observing or otherwise noting the order of particular signal transitions, the direction of rotation can be obtained. Receiving the signal transitions in the order shown indicates CCW rotation; CW rotation is indicated if the order is reversed. Thus, angular velocity (angular speed with direction) of the sensor 40 can be determined.

FIGS. 4a–4d show an alternate angular position sensor, generally designated 62, that in all essential respects is identical in construction and operation to the sensor 40 shown in FIGS. 3a–3d with the following exceptions. First, second, and third brushes 64, 66, 68 do not rotate, but rather are stationary and ride against a unitary track segment 70 as the track segment 70 rotates past them. The track segment 70 may define 270° of a circle and is coupled to the object whose angular position is sought to be measured. A first signal tap 72 is taken off of the first brush 64 and a second signal tap 74 is taken off of the third brush 68, while between the first and third brushes a reference voltage signal input 76 is applied to the second brush 66 as shown. Signal processing and analysis are in accordance with the principles set forth above.

Figure 5:
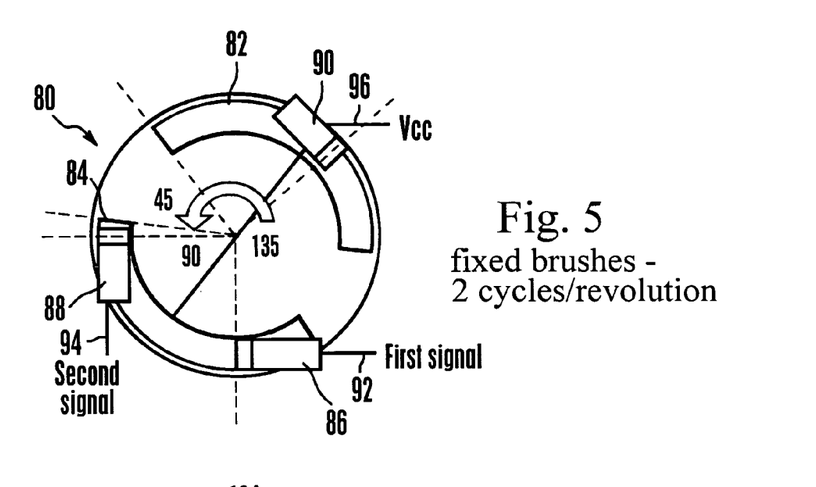
FIG. 5 is a plan view of another alternate embodiment of the position sensor in which two signal cycles per revolution are generated and in which the tracks rotate.

Now referring to FIG. 5, an angular position sensor is shown, generally designated 80, that includes rotatable first and second track segments 82, 84. The first and second track segments 82, 84 each describe about 135° or so of a circle and lie on the same circle, and their ends are spaced from the facing ends of the other track segment by at least five degrees (5°) and more preferably by 45° as shown. First, second, and third stationary brushes 86, 88, 90 ride on the track segments 82, 84 with a first signal tap 92 being taken off of the first brush 86, a second signal tap 94 being taken off of the second brush 88, and a reference voltage input 96 being applied to the third brush 90. The position sensor 80 shown in FIG. 5 outputs two signal cycles for each complete revolution of the track segments 82, 84. Signal processing for each half revolution is undertaken in accordance with the principles above.

Figure 6:
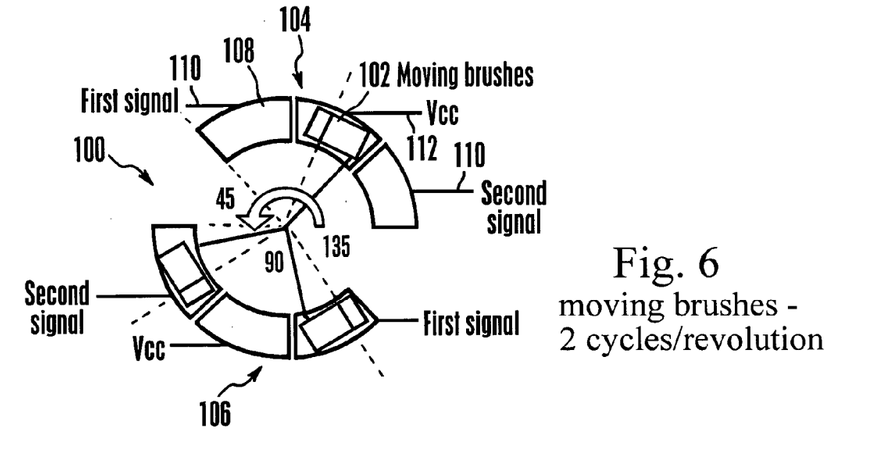
FIG. 6 is a plan view of still another alternate embodiment of the position sensor in which two signal cycles per revolution are generated and in which the brushes rotate.

FIG. 6 shows a sensor 100 that in all essential respects is identical in construction and operation to the sensor 80 shown in FIG. 5, except that FIG. 6 has rotating brushes 102 that are electrically connected together and that ride on first and second groups 104, 106 of three track segments 108 each as shown, with the groups 104, 106 being located on a common circle. The segments 108 in a group are closely spaced from each other just enough to electrically isolate them from each other, with the ends of the groups being spaced from each other by at least 5° and perhaps up to 45° or more as shown. Within each group, first and second signal taps 110 are taken off of respective end segments 108 while the voltage reference 112 is applied to the middle segment of the group. The position sensor 100 shown in FIG. 6 outputs two signal cycles for each complete revolution of the track segments 82, 84. Signal processing for each half revolution is undertaken in accordance with the principles above.

Figure 7:
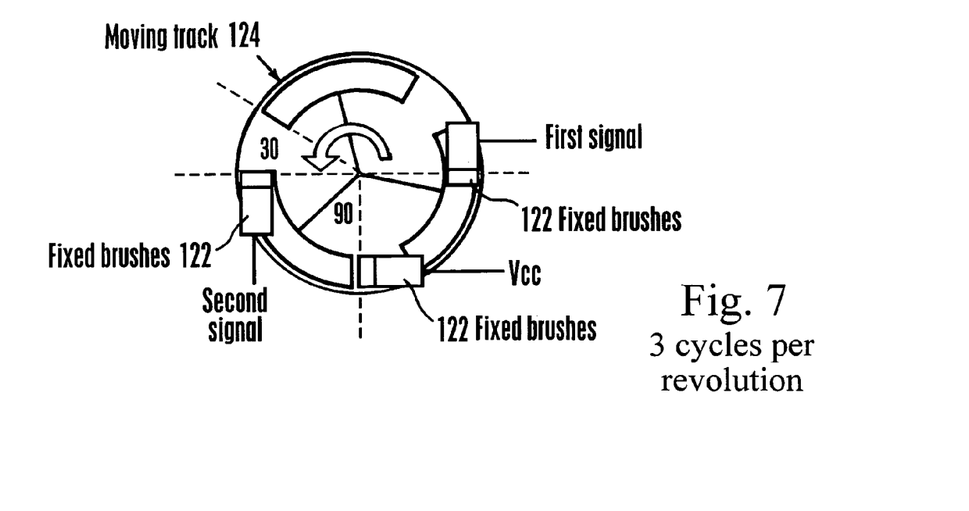
FIG. 7 is a plan view of still another alternate embodiment of the position sensor in which three signal cycles per revolution are generated.

FIG. 7 shows that the above principles can be applied by a sensor 120 to generate three signal cycles per revolution. While FIG. 7 shows three fixed brushes 122 and three moving track segments 124, the principles set forth herein can apply to moving brushes and fixed track segments. The track segments 124 shown in FIG. 7 are separated from each other by 30° and each segment 124 spans 90°. Each track segment 124 can include at least one sub-segment depending on whether the brushes or the track segment rotates. Even more segments can be used to generate more than three signal cycles per revolution.

Figure 8:
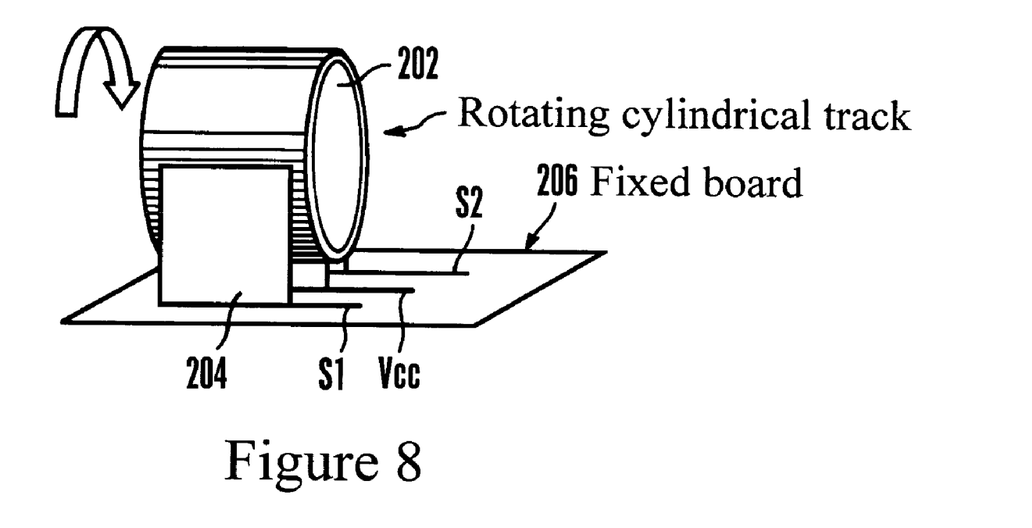
FIG. 8 is a perspective view of a rotating cylindrical track.
Figure 9:
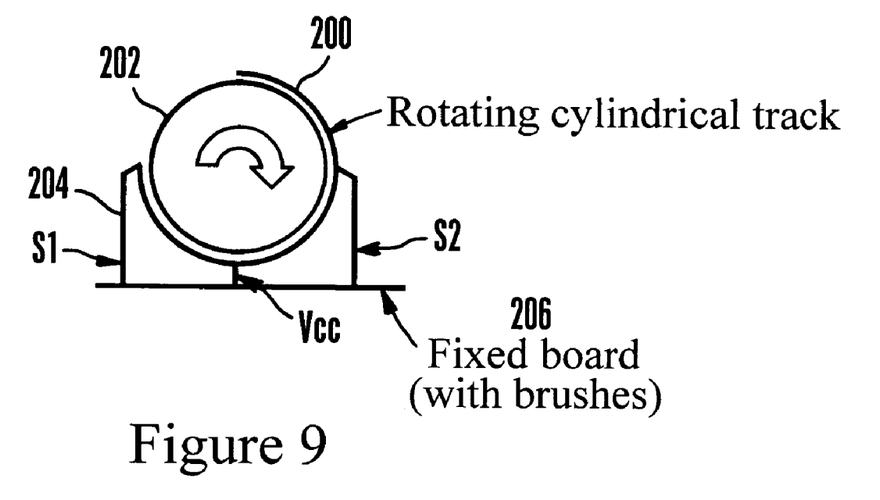
FIG. 9 is a front elevational view of the track shown in FIG. 8.

Completing the description, while flat track segments are shown it is to be understood that the track segments may be curvilinear, and more particularly may describe a portion of a cylinder as shown in FIGS. 8 and 9. Specifically, a track 200 that describes a portion of a cylinder (and, hence, as used herein is "cylindrical") can be affixed to a rotatable object 202. Three brushes 204 can be affixed to a fixed board 206 for operation as described above when the track 200 rotates past the brushes 204 to generate first and second signals (labelled "S1" and "S2" in FIGS. 8 and 9) when the track rotates and a reference voltage (labelled "$V_{cc}$" in FIGS. 8 and 9) is applied to the middle brush 204.

While the particular SINGLE TRACK BRUSH-BASED POSITION ENCODER FOR ROTATING SHAFT as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A powered assembly, comprising:
    at least one object that can be moved between a first configuration and a second configuration, the object being selected from the group consisting of window coverings, awnings, skylight coverings, curtains, and screens;
    at least one motor assembly;
    at least one actuator coupled to the motor assembly and the object to move the object when the motor is energized; and
    at least one position sensor to generate at least two phase shifted logic signals representative of the angular position of at least one of: the motor assembly, and the actuator, the position sensor comprising:
    plural brushes; and
    one and only one track defining a single radius, the track including at least one track segment defining a portion of a circle, the brushes riding on the track, relative motion between the track and brushes being effected when the object is moved to generate a signal representative of an angular position; and
    wherein an electrical contact between two brushes is established by one track segment when the signals are collected on the brushes, and wherein an electrical contact between two track segments is established by at least two brushes when the signals are collected on the track segments.

2. The powered assembly of claim 1, wherein the motor is powered by at least one dc battery.

3. The powered assembly of claim 1, wherein the actuator is a roll-up tube, and the position sensor senses the angular position of the tube.

4. The powered assembly of claim 3, comprising a ring gear rotating with the roll-up tube and position sensor gear meshed with the ring gear and coupled to one of: the brushes, or the track, to move the brushes or track relative to the other of: the track, or the brushes.

5. The powered assembly of claim 4, wherein the position sensor gear is coupled to the brushes to rotate the brushes when the position sensor gear rotates.

6. The powered assembly of claim 1, wherein the brushes rotate and the track includes first, second, and third track segments each spanning approximately ninety degrees (90°) and the plural brushes include first, second, and third brushes, a first signal tap being established on the first track segment, a second signal tap being established on the third track segment, and a reference voltage tap being established on the second track segment intermediate the first and third track segments.

7. The powered assembly of claim 1, wherein the track rotates and the track spans approximately two hundred seventy degrees (270°) and the plural brushes include first, second, and third brushes, a first signal tap being established on the first brush, a second signal tap being established on the third brush, and a reference voltage tap being established on the second brush intermediate the first and third brushes.

8. The powered assembly of claim 1, wherein the brushes rotate and the track includes at least first and second groups of three track segments each, the first and second groups being spaced from each other by forty five degrees (45°) or less, the position sensor outputting at least two signal cycles for each complete revolution.

9. The powered assembly of claim 1, wherein the track rotates and the track includes at least first and second track segments, the first and second track segments being spaced from each other by forty five degrees (45°) or less, the position sensor outputting at least two signal cycles for each complete revolution.

10. The powered assembly of claim 1, wherein the track includes at least first, second, and third track segments spaced from each other by forty five degrees (45°) or less, each track segment including at least one sub-segment depending on whether the brushes or the track rotates, the position sensor outputting at least three signal cycles for each complete revolution.

11. The powered assembly of claim 1, wherein the at least two phase shifted signals are two quadrature signals.

12. A position sensor couplable to a rotating object for generating at least two phase shifted logic signals representative of at least one of: the angular position, angular speed, and direction of rotation, of the object, the position sensor comprising:
    at least one track segment defining a portion of a circle characterized by a radius; and
    plural brushes each being spaced from the center of the circle by a distance substantially equal to the radius, the brushes riding on the track segment to generate signals when rotation of the object causes relative motion between the brushes and track segment; and wherein an electrical contact between two brushes is established by one track segment when the signals are collected on the brushes, and wherein an electrical contact between two track segments is established by at least two brushes when the signals are collected on the track segments.

13. The position sensor of claim 12, comprising no brushes other than the plural brushes.

14. The position sensor of claim 12, wherein the object is selected from the group consisting of window coverings, awnings, skylight coverings, curtains, and screens.

15. The position sensor of claim 12, wherein the brushes rotate and the position sensor comprises first, second, and third track segments each spanning approximately ninety degrees (90°) and the plural brushes include first, second, and third brushes, a first signal tap being established on the first track segment, a second signal tap being established on the third track segment, and a reference voltage tap being established on the second track segment intermediate the first and third track segments.

16. The position sensor of claim 12, wherein the track segment rotates and the track segment spans approximately two hundred seventy degrees (270°) and the plural brushes include first, second, and third brushes, a first signal tap being established on the first brush, a second signal tap being established on the third brush, and a reference voltage tap being established on the second brush intermediate the first and third brushes.

17. The position sensor of claim 12, wherein the brushes rotate and the position sensor comprises at least first and second groups of three track segments each, the first and second groups being spaced from each other by forty five degrees (45°) or less, the position sensor outputting at least two signal cycles for each complete revolution.

18. The position sensor of claim 12, including at least first and second track segments, the track segments rotating when the object rotates, the first and second track segments being spaced from each other by forty five degrees (45°) or less, the position sensor outputting at least two signal cycles for each complete revolution.

19. The position sensor of claim 12, comprising at least first, second, and third track segments spaced from each other by forty five degrees (45°) or less, each track segment including at least one sub-segment depending on whether the brushes or the track segments rotate, the position sensor outputting at least three signal cycles for, each complete revolution.

20. The position sensor of claim 12, wherein the at least two phase shifted signals are two quadrature signals.

21. A position sensor for outputting at least two quadrature logic signals representative of the angular position of a rotatable object using track structure arranged in a single track circle, at least one track segment disposed on the circle, and plural brushes riding on the track segment when the object rotates; and wherein an electrical contact between two brushes is established by one track segment when the signals are collected on the brushes, and wherein an electrical contact between two track segments is established by at least two brushes when the signals are collected on the track segments.

22. The position sensor of claim 21, wherein the object is selected from the group consisting of window coverings, awnings, skylight coverings, curtains, and screens.

23. The position sensor of claim 21, wherein the brushes rotate and the position sensor comprises first, second, and third track segments each spanning approximately ninety degrees (90°) and the plural brushes include first, second, and third brushes, a first signal tap being established on the first track segment, a second signal tap being established on the third track segment, and a reference voltage tap being established on the second track segment intermediate the first and third track segments.

24. The position sensor of claim 21, wherein the track segment rotates and the track segment spans approximately two hundred seventy degrees (270°) and the plural brushes include first, second, and third brushes, a first signal tap being established on the first brush, a second signal tap being established on the third brush, and a reference voltage tap being established on the second brush intermediate the first and third brushes.

25. The position sensor of claim 21, wherein the brushes rotate and the position sensor comprises at least first and second groups of three track segments each, the first and second groups being spaced from each other by forty five degrees (45°) or less, the position sensor outputting at least two signal cycles for each complete revolution.

26. The position sensor of claim 21, including at least first and second track segments, the track segments rotating when the object rotates, the first and second track segments being spaced from each other by forty five degrees (45°) or less, the position sensor outputting at least two signal cycles for each complete revolution.

27. The position sensor of claim 21, comprising at least first, second, and third track segments spaced from each other by forty five degrees (45°) or less, each track segment including at least one sub-segment depending on whether the brushes or the track segments rotate, the position sensor outputting at least three signal cycles for each complete revolution.

* * * * *